(12) United States Patent
Jeon

(10) Patent No.: US 9,178,459 B2
(45) Date of Patent: Nov. 3, 2015

(54) VECTOR CONTROL APPARATUS OF INDUCTION MOTOR

(71) Applicant: LSIS CO., LTD., Anyang-si, Gyeonggi-do (KR)

(72) Inventor: Mi Rim Jeon, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/314,929

(22) Filed: Jun. 25, 2014

(65) Prior Publication Data

US 2015/0008863 A1 Jan. 8, 2015

(30) Foreign Application Priority Data

Jul. 3, 2013 (KR) ......................... 10-2013-0077695

(51) Int. Cl.
*H02P 21/00* (2006.01)

(52) U.S. Cl.
CPC ........ *H02P 21/0096* (2013.01); *H02P 21/0035* (2013.01)

(58) Field of Classification Search
CPC .......................... H02P 21/0096; H02P 21/0035
USPC ............. 318/400.01, 400.02, 400.07, 400.14, 318/400.15, 430, 432, 568.22, 596, 609, 318/610, 632, 727, 779, 799, 800, 801; 73/862.194, 862.391; 74/501.5 R; 139/103, 311; 180/231
See application file for complete search history.

(56) References Cited

U.S. PATENT DOCUMENTS 6,068,206 A * 5/2000 Lindsay, Jr. ................. 242/334.3
8,786,219 B2 * 7/2014 Ikeda et al. ......................... 318/6

FOREIGN PATENT DOCUMENTS

| JP | 63-251804 | 10/1988 |
| JP | 01-259778 | 10/1989 |
| JP | 02-018263 | 1/1990 |
| JP | 05-000748 | 1/1993 |
| JP | 2002-154748 | 5/2002 |
| JP | 2008-221343 | 9/2008 |
| JP | 2013-017385 | 1/2013 |

OTHER PUBLICATIONS

Japan Patent Office Application Serial No. 2014-137862, Office Action dated Jun. 25, 2015, 4 pages.

* cited by examiner

*Primary Examiner* — Antony M Paul
(74) *Attorney, Agent, or Firm* — Lee, Hong, Degerman, Kang & Waimey

(57) ABSTRACT

The present disclosure provides a vector control apparatus that operates by a diameter computation-free winder velocity control algorithm with enhanced operational reliability. The vector control apparatus configured to control tension of a motor free from diameter computation includes a tension velocity generator configured to generate command velocity information for constantly maintaining a tension of the motor by adding a PID (Proportional Integral Differential) output value to a value computing a compensation gain value substituting a diameter computation value of a motor to be controlled and a command linear velocity provided from outside, and a vector controller configured to perform a tension control of the motor by receiving a command velocity information provided the tension velocity generator.

3 Claims, 3 Drawing Sheets

VECTOR CONTROL APPARATUS OF INDUCTION MOTOR

CROSS-REFERENCE TO RELATED APPLICATIONS

Pursuant to 35 U.S.C. §119 (a), this application claims the benefit of earlier filing date and right of priority to Korean Patent Application No. 10-2013-0077695, filed on Jul. 3, 2013, the contents of which are all hereby incorporated by reference in their entirety.

BACKGROUND OF THE INVENTION

1. Field of the Invention

The teachings in accordance with the exemplary embodiments of this present disclosure generally relate to a vector control apparatus of induction motor, and more particularly to a vector control apparatus of induction motor configured to be operated by a winder control algorithm free from diameter computation.

2. Description of Related Art

Several motors simultaneously drive rollers on continuous product manufacturing lines such as steel, paper, textile and film manufacturing industries. The purpose of controlling rollers in the continuous processing is to constantly maintain a line speed of line and to simultaneously maintain a tension on materials. When an excessively high tension is generated on rollers due to speed deviation, materials may be ruptured, and when an excessively low tension is generated, meandering may be generated. When a high level controller in the continuous processing system calculates a diameter of material and motor command torque in response to linear velocity command, and instructs an inverter, the inverter drives the motor in response to the command torque.

Thus, an accurate control of a motor by an inverter may determine a stable operation of rollers in the continuous product manufacturing lines.

SUMMARY OF THE DISCLOSURE

An exemplary embodiment of the present disclosure is to provide a vector control apparatus of induction motor configured to be operated by a winder control algorithm free from diameter computation, whereby operational reliability can be enhanced.

In one general aspect of the present disclosure, there is provided a vector control apparatus configured to control tension of a motor free from diameter computation, the vector control apparatus, comprising:

a tension velocity generator configured to generate command velocity information for constantly maintaining a tension of a motor by adding a PID (Proportional Integral Differential) output value to a value computing a compensation gain value substituting a diameter computation value of a motor to be controlled and a command linear velocity provided from outside are computed; and a vector controller configured to perform a tension control of the motor by receiving the command velocity information provided the tension velocity generator.

Preferably, but not necessarily, the tension velocity generator may include a comparator configured to compare a PID command inputted from the outside with a PID feedback value and to output an error of PID value in response to the comparison, a PID controller configured to output a PID output for compensating the error of the PID value outputted from the comparator, a compensation gain computing element configured to compute a compensation gain corresponding to a diameter value of the motor by determining the PID output, a multiplier configured to multiply a command velocity provided from outside for control of the motor by the compensation gain, and an adder configured to add a command velocity outputted from the multiplier and a PID output outputted from the PID controller.

Preferably, but not necessarily, a final command velocity computation configured to control the motor by the vector control apparatus may be computed based on the a formula of (command velocity [rad/s]={(linear velocity command [rad/s]*compensation gain(CompGain))+PID output [rad/s]}.

Advantageous Effects of the Disclosure

The vector control apparatus of induction motor according to an exemplary embodiment of the present disclosure has a first advantageous effect in that compensation gain is computed by using an output value of PID controller by the compensation gain computing element.

The second advantageous effect is to realize a diameter computation-free winder velocity control algorithm for constantly maintaining a tension using no diameter computation by compensating, without diameter computation, a linear velocity for maintaining a tension, aside from a PID controller by applying a computed compensation gain to a command linear velocity.

DETAILED DESCRIPTION OF THE DISCLOSURE

Hereinafter, features and advantages of the disclosed embodiments will be or will become apparent to one of ordinary skill in the art upon examination of the following figures and detailed description. The vector control apparatus according to exemplary embodiments of the present disclosure will be described in detail with reference to the accompanying drawings.

The present disclosure relates to a diameter computation-free winder velocity control algorithm capable of performing a tension control with no material rupture and meandering by constantly maintaining a tension of an inverter through computation of command torque of a motor in response to actual diameter change of material using no diameter computation when a linear velocity and a reference tension are instructed to the inverter in a continuous processing line.

An inverter drives a motor by performing a motor command velocity and tension control in response to a material diameter. In this case, the inverter uses a diameter computation algorithm and controls the motor command velocity and tension control using a diameter obtained therefrom, where a tension PID controller compensates an instantaneous tension.

In performing a motor command torque and tension control using a PID controller by installing a winder function on a vector inverter, the present disclosure is configured to improve an inverter function by proposing a new diameter computation-free velocity control winder algorithm using no diameter computation of material.

Figure 1:
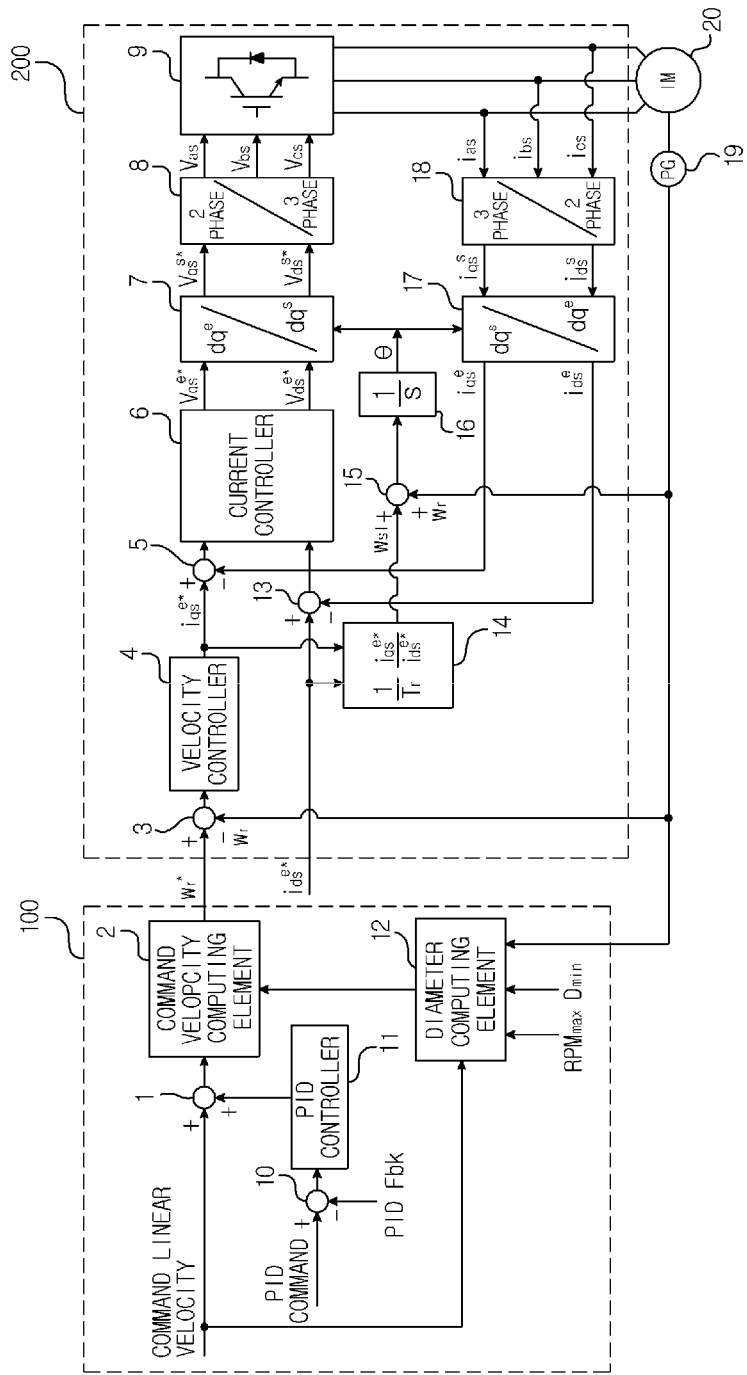
FIG. 1 is a block diagram illustrating a diameter computation-free velocity control winder algorithm according to an exemplary embodiment of the present disclosure.

FIG. 1 is a block diagram illustrating a vector control apparatus of induction motor according to an exemplary embodiment of the present disclosure.

Referring to FIG. 1, the vector control apparatus of induction motor includes a tension velocity generator (100) and a vector controller (200). The tension velocity generator (100) includes a comparator (10), a PID controller (11), a diameter computing element (12), an adder (1) and a command velocity computing element (2).

The comparator (10) compares a command velocity inputted from outside, a PID command inputted from outside and an actual PID feedback value (Fbk), and outputs an error in response to the comparison thereof. The PID controller (11) outputs a PID output for compensating an error of the PID value outputted from the comparator (10). The adder (1) adds a command velocity inputted from outside to a PID output outputted from the PID controller (11). The diameter computing element (12) computes a diameter using a command linear velocity, a maximum velocity (RPMmax) and a minimum diameter (Dmin) of a motor at a command linear velocity and a maximum linear velocity command, and a rotation velocity detected by a velocity detector (19). The command velocity computing element (2) computes a command velocity by applying a diameter value obtained from the diameter computing element (12) to the velocity outputted from the adder (1).

The vector controller (200) includes a comparator (3), a velocity controller (4), a comparator (5), a current controller (6), a voltage coordinate converter (7), a 3-phase voltage converter (8), a vector control inverter (9), a comparator (13), a slip computing element (14), an adder (15), an integrator (16), a current coordinate converter (17), and a current converter (18).

The comparator (3) compares a rotation velocity ($\omega_r$) detected by the velocity detector (19) with a command value ($\omega_r^*$) outputted by the command velocity computing element (2) and outputs an error in response to the comparison thereof. The comparator (5) compares a torque current command value ($i_{qs}^{e*}$) for compensating an error caused by velocity outputted from the comparator (3) with an actual torque current ($i_{qs}^e$) and outputs the comparison. The comparator (13) compares a flux current command value ($i_{ds}^{e*}$) inputted from outside with an actually outputted flux current ($i_{ds}^e$) and outputs the comparison. The current controller (6) generates a flux voltage command value ($v_{ds}^{e*}$) and a torque voltage command value ($v_{qs}^{e*}$) through a torque current and a flux current outputted after being compared by the comparator (5) and the comparator (13). The voltage coordinator converter (7) converts a flux voltage command value ($v_{ds}^{e*}$) and a torque voltage command value ($v_{qs}^{e*}$) at a rotation coordinate outputted from the current controller (6) from a rotation coordinate to a stationary coordinate, and outputs the same.

The 3-phase voltage converter (8) converts a flux voltage command value ($v_{ds}^{s*}$) and a torque voltage command value ($v_{qs}^{s*}$) at a stationary coordinate outputted from the voltage coordinate converter (7) to 3-phase voltages ($v_{as}, v_{bs}, v_{cs}$) of stationary coordinate and outputs the same. The vector control inverter (9) applies the 3-phase voltage ($v_{as}, v_{bs}, v_{cs}$) of 3-phase voltage converter (8) to an induction motor (20) and rotates the induction motor.

A 2-phase current converter (18) receives 3-phase currents ($i_{as}, i_{bs}, i_{cs}$) detected during rotation of the induction motor (20) and outputs currents ($i_{ds}^s, i_{qs}^s$) converted to d axis and q axis of the stationary coordinate. The current coordinate converter (17) converts currents ($i_{ds}^s, i_{qs}^s$) of stationary coordinate outputted from the 2-phase current converter (18) to an actual flux current ($i_{ds}^e$) and a torque current ($i_{qs}^e$) of rotation coordinate and outputs the same. The slip computing element (14) uses the torque current command value ($i_{qs}^{e*}$) outputted from the velocity controller (4), a flux current command value ($i_{ds}^{e*}$) inputted from outside and an induction motor rotor time constant ($T_r$) to compute a slip frequency ($\omega_{sl}$). The adder (15) adds the slip frequency ($\omega_{sl}$) computed by the slip computing element (14) and a velocity ($\omega_r$) detected by the velocity detector (19).

The integrator (16) integrates a value added by the adder (15) to set a position ($\theta$) of rotor flux used by the voltage coordinate converter (7) and the current coordinate converter (17).

Successively the vector control apparatus illustrated in FIG. 1 will be described. When the induction motor (20) is rotated, the velocity detector (19) detects the rotation velocity ($\omega_r$) and outputs the detected velocity. A command velocity inputted from outside, a PID command inputted from outside and an actual PID feedback value (Fbk) are compared, and a velocity is outputted to the adder (1) in which an output of the PID controller (11) is added that outputs a PID output for compensating an output error of the comparator (10) outputting an error in response to the comparison.

When an output of the command velocity computing element (2) computing a final velocity command ($\omega_r^*$) is inputted to a non-inversion terminal (+) of the comparator (3) by applying, to the velocity outputted from the adder (1), a diameter value outputted from the diameter computing element (12) by using the command linear velocity, a maximum velocity (RPMmax) and a minimum diameter of a motor at the maximum linear velocity command and a rotation velocity detected from the velocity detector (19), the comparator (3) receives a rotation velocity ($\omega_r$) from the velocity detector (19) inputted to an inversion terminal (−) to obtain an error between the values and output the error to the velocity controller (4).

Furthermore, a flux current command value ($i_{ds}^{e*}$) inputted from outside is inputted to the non-inversion terminal (+) of the comparator (13). The 3-phase currents ($i_{as}, i_{bs}, i_{cs}$) detected by the induction motor (20) at the time of rotation are outputted as stationary coordinate 2-phase currents ($i_{ds}^s, i_{qs}^s$) by the 2-phase current converter (18). The stationary coordinate 2-phase currents ($i_{ds}^s, i_{qs}^s$) outputted by the 2-phase current converter (18) are inputted to the current coordinate converter (17) and outputted as an actual flux current ($i_{ds}^e$) of the rotation coordinate and torque current ($i_{qs}^e$). Furthermore, the flux current ($i_{ds}^e$) outputted from the current coordinate converter (17) is outputted to an inversion terminal (−) of the comparator (13). Then, the comparator (13) obtains an error between the flux current command value ($i_{ds}^{e*}$) inputted from outside and an actual flux current ($i_{ds}^e$) outputted from the current coordinate converter (17) and outputs the error to the current controller (6). Furthermore, the comparator (5) receives the torque current command value ($i_{qs}^{e*}$) outputted from the velocity controller (4) at the non-inversion terminal (+) and receives the Actual torque current ($i_{qs}^e$) outputted from the current coordinate converter (17) at the inversion terminal (−) to obtain an error between the two values, and the obtained error is outputted to the current controller (6). Then, the current controller (6) receiving, as input, the torque current outputted from the comparator and flux current outputted from the comparator outputs to the voltage coordinate converter (7), outputs the flux voltage command value ($v_s^{e*}$) and the torque voltage command value ($v_{qs}^{e*}$) to the voltage coordinate converter (7) through control.

The voltage coordinate converter (7) receives the flux voltage command value ($v_{ds}^{s*}$) and the torque voltage command value ($v_{qs}^{s*}$) converts to 3-phase voltages ($v_{as}$, $v_{bs}$, $v_{cs}$) through the 3-phase voltage converter (8), and provide the same to the vector control inverter (9), where the vector control inverter (9) applies the 3-phase voltages ($v_{as}$, $v_{bs}$, $v_{cs}$) to the induction motor (20). Thus, the induction motor (20) is rotated, and at this time, actual flux current ($i_{ds}^{e}$) and torque current ($i_{qs}^{e}$) converted from actual rotation coordinate to d axis and q axis through the current coordinate converter (18) and the 2-phase current converter (17) are generated, and the flux current ($i_{ds}^{e}$) among the currents thus generated is outputted to the comparator (13), and the torque current ($i_{qs}^{e}$) is outputted to the comparator. Furthermore, the slip computing element (14) computes a slip frequency ($\omega_{sl}$) using the torque current command value ($i_{qs}^{e*}$) inputted from outside, flux current command value ($i_{ds}^{e*}$) inputted from outside and an induction motor rotor time constant, and the slip frequency ($\omega_{sl}$) is outputted to a terminal at one side of the adder (15).

Then, the adder (15) adds a velocity ($\omega_r$) outputted from the velocity detector (19) and the slip frequency ($\omega_{sl}$) outputted from the slip computing element (14) and outputs the addition to the integrator (16), where the integrator (16) outputs a value integrated to a value outputted from the adder (15), i.e., a position ($\theta$) of rotor flux to the voltage coordinate converter (7) and the current coordinate converter (17). Thus, the voltage coordinate converter (7) and the current coordinate converter (17) controls a coordinate conversion in response to the position ($\theta$) of the rotor flux inputted from the integrator (16), and subsequent operation is as mentioned before.

The vector control apparatus thus described outputs a command velocity by applying basically computed diameter value for obtaining a torque command for maintaining a tension. At this time, in order to compute a diameter, a user must learn an accurate maximum linear velocity, bobbin diameter and gear ratio of winder system. However, there are cases where various diameters of bobbin are actually used and an accurate measurement value for diameter computation cannot be obtained, where, if no computation function is not used, the torque command changed value in response to actual diameter change is compensated only by a PID controller. In this case, a quick control in response to the instantaneous change cannot be performed due to saturation of the PID controller. Thus, a need is proposed to a control technique capable of coping with an actual diameter change without saturation of output value of the PID controller.

To this end, the vector control apparatus according to the present disclosure is configured such that when an upper level controller instructs a linear velocity and tension to an inverter, a command linear velocity is computed by applying, to the applied linear velocity, a compensation gain (Comp Gain) substitutable of diameter value, and a command velocity is computed for constantly maintaining a tension by adding a computed PID controller output value to the command linear velocity using the tension measurement value obtained through the applied tension command and tension sensor.

At this time, the PID controller output value is used for compensation gain computation lest saturation be generated. An improvement of an inverter using a vector control method can be expected by realizing a diameter computing element-free, diameter computation-free winder control algorithm on a continuous process lines that drives a motor using a calculated final command velocity.

Figure 2:
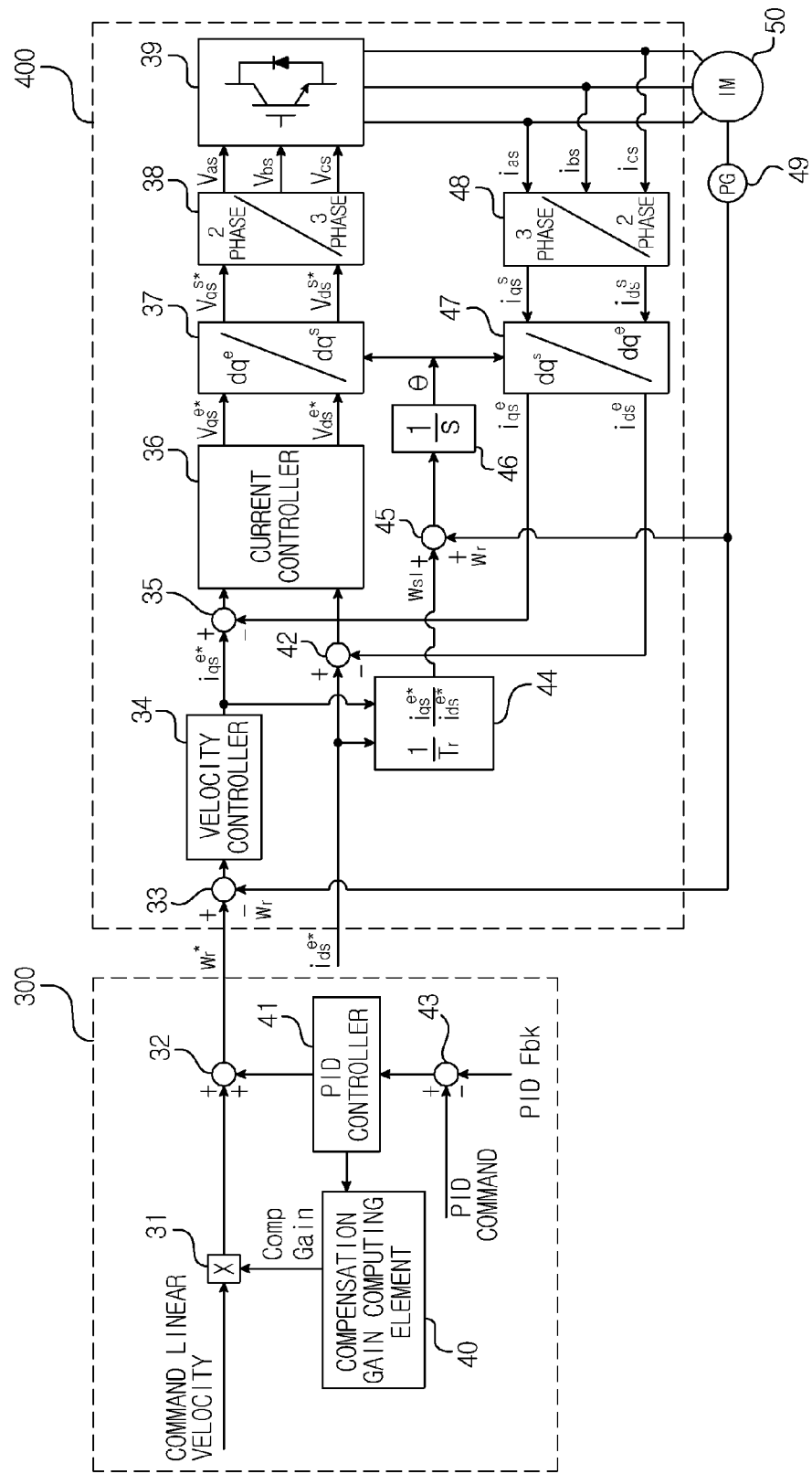
FIG. 2 is a block diagram illustrating a diameter computation-free velocity control winder algorithm according to another exemplary embodiment of the present disclosure.
Figure 3:
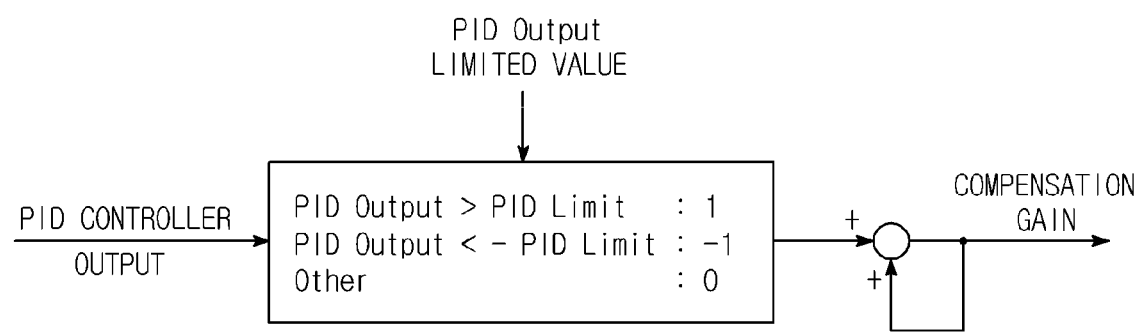
FIG. 3 is a block diagram illustrating a compensation gain computing element of FIG. 2.

FIG. 2 is a block diagram illustrating a diameter computation-free velocity control winder algorithm according to another exemplary embodiment of the present disclosure, and FIG. 3 is a block diagram illustrating a compensation gain computing element of FIG. 2.

Referring to FIG. 2, the vector control apparatus configured to realize a diameter computation-free winder control algorithm according to an exemplary embodiment of the present disclosure includes a tension velocity generator (300) and a vector controller (400).

The tension velocity generator (300) includes a multiplier (31), an adder (32), a compensation gain computing element (40), a PID controller (41) and a comparator (43). The multiplier (31) provides a command velocity in which a command velocity provided from outside for motor (50) control is multiplied by a compensation gain outputted from the compensation gain computing element (40). The adder (32) adds the command velocity outputted from the multiplier (31) and the PID output outputted from the PID controller (41). The comparator (43) compares a PID command inputted from outside with a PID feedback value (Fbk), and outputs an error resultant from the comparison. The PID controller (41) outputs a PID output for compensating an error of PID value outputted from the comparator (43). The compensation gain computing element (40) computes a compensation gain corresponding to a diameter value of the motor by determining the PID output of the PID controller (41).

Furthermore, the velocity detector detects a rotation velocity of the induction motor (50). The vector controller (400) includes a comparator (33), a velocity controller (34), a comparator (35), a current controller (36), a voltage coordinate converter (37), a 3-phase voltage converter (38), a vector control inverter (39), a comparator (42), a slip computing element (44), an adder (45), an integrator (46), a current coordinate converter (47) and a current converter (48).

The comparator (33) compares a rotation velocity ($\omega_r$) detected by the velocity detector (49) with a command value ($\omega_r^*$) outputted from the adder (32), and outputs an error resultant from the comparison. The velocity controller (34) outputs a torque current command value ($i_{qs}^{e*}$) for compensating an error resultant from a velocity outputted from the comparator (33). The comparator (35) compares the torque current command value ($i_{qs}^{e*}$) outputted from the velocity controller (34) with an actual torque current ($i_{qs}^{e}$) and outputs the comparison. The comparator (42) compares a flux current command value ($i_{ds}^{e*}$) inputted from outside with an actually outputted flux current ($i_{ds}^{e}$) and outputs the comparison.

The current controller (36) generates a torque current and a flux current outputted after being compared by the comparators (35, 42) through a controller as a flux voltage command value ($v_{ds}^{e*}$) and torque voltage command value ($v_{qs}^{e*}$) and outputs same.

The voltage coordinate converter (37) converts the flux voltage command value ($v_{ds}^{e*}$) and the torque voltage command value ($v_{qs}^{e*}$) outputted from the current controller (6) on the rotation coordinate to the flux voltage command value ($v_{ds}^{e*}$) and the torque voltage command value ($v_{qs}^{e*}$) on the stationary coordinate, and outputs same.

The 3-phase voltage converter (38) converts the flux voltage command value ($v_{ds}^{s*}$) and the torque voltage command value ($v_{qs}^{s*}$) on the stationary coordinate outputted from the voltage coordinate converter (37) to 3-phase voltage ($v_{as}$, $v_{bs}$, $v_{cs}$) on the stationary coordinate and outputs same. The vector control inverter (39) applies the 3-phase voltages ($v_{as}$, $v_{bs}$, $v_{cs}$) of the 3-phase voltage converter (38) to the induction motor (50) and rotates the induction motor. The 2-phase current converter (48) receives the 3-phase currents ($i_{as}$, $i_{bs}$, $i_{cs}$)

detected during rotation of the induction motor (50) and outputs currents ($i_{ds}^s$, $i_{qs}^s$) converted to d axis and q axis on the stationary coordinate.

The current coordinate converter (17) converts the currents ($i_{ds}^s$, $i_{qs}^s$) of the stationary coordinate outputted from the 2-phase current converter (48) to actual flux current ($i_{ds}^e$) and torque current ($i_{qs}^e$) of rotation coordinate and outputs the same. The slip computing element (44) computes a slip frequency ($\omega_{sl}$) using the torque current command value ($i_{qs}^{e*}$) outputted from the velocity controller (34) and flux current command value ($i_{ds}^{e*}$) inputted from outside and the induction motor rotor time constant ($T_r$).

The computing element (44) computes a slip frequency ($\omega_{sl}$) using the torque current command value ($i_{qs}^{e*}$) outputted from the velocity controller (34), the flux current command value ($i_{ds}^{e*}$) inputted from outside and the induction motor rotor time constant ($T_r$). The adder (45) adds the slip frequency ($\omega_{sl}$) computed by the slip computing element (44) to the velocity ($\omega_r$) detected by the velocity detector (49). The integrator (46) integrates the value added by the adder (45) to set a position ($\theta$) of the rotor flux used by the voltage coordinate converter (37) and the current coordinate converter (47).

Now, the vector control apparatus of induction motor thus configured according to an exemplary embodiment of the present disclosure will be described in detail.

A velocity command is outputted by being multiplied to the command linear velocity applied with the initially-set compensation gain (Comp Gain) value. A final command velocity ($\omega_r^*$) is outputted by adding the outputted linear velocity to the output of the PID controller (41). As the operation of winder advances, a diameter of a material changes, and tension is also changed in response to the changed diameter of the material. At this time, in order to maintain the tension at a predetermined constant level, a command velocity value is changed through the PID controller (41), where, when an output value of the PID controller (41) exceeds a predetermined value (PID output limitation value), the compensation gain computing element (40) automatically adds or deducts the compensation gain (Comp Gain) value to compensate the value through the command linear velocity multiplier (31) to thereby reduce a velocity value changed by the PID controller (41). The compensation gain computing element (40) may be defined in detail as illustrated in FIG. 3.

The final command velocity computation through the computed compensation gain (Comp Gain) value and the output of the PID controller (11) may be computed based on the following equation 1.

Command velocity [rad/s]={(linear velocity command [rad/s]*compensation gain(CompGain))+PID output [rad/s]}     [Equation 1]

When the velocity command value ($\omega_r^*$) computed by the adder (32) is inputted to the non-inversion terminal (+) of the comparator (33), the comparator (33) receives a rotation velocity ($\omega_r$) of the velocity detector (49) inputted to an inversion terminal (−) to obtain an error between the two values, and outputs the error to the velocity controller (34). An output of the velocity controller (34) is inputted to the non-inversion terminal (+) of the comparator (35). The flux current command value ($i_{ds}^{e*}$) inputted from the outside is inputted to the non-inversion terminal (+) of the comparator (42). The 3-phase currents ($i_{as}$, $i_{bs}$, $i_{cs}$) detected from the induction motor (50) during rotation of the induction motor (50) are outputted by the 2-phase current converter (48) as stationary coordinate 2-phase currents ($i_{ds}^s$, $i_{qs}^s$). The stationary coordinate 2-phase currents ($i_{ds}^s$, $i_{qs}^s$) outputted by the 2-phase current converter (48) are inputted to the current coordinate converter (47) to be outputted as actual flux current ($i_{ds}^e$) and torque current ($i_{qs}^e$) of the rotation coordinate, whereby the flux current ($i_{ds}^e$) outputted from the current coordinate converter (47) is outputted to the inversion terminal (−) of the comparator (42).

Successively, the comparator (42) obtains an error between the flux current command value ($i_{ds}^{e*}$) inputted from the outside and the actual flux current ($i_{ds}^e$) outputted from the current coordinate converter (47) and outputs the error to the current controller (36). Then, the comparator (35) receives the torque current command value ($i_{qs}^{e*}$) outputted from the velocity controller (34) at the non-inversion terminal (+), and receives the actual torque current ($i_{qs}^e$) outputted from the current coordinate converter (47) at the inversion terminal (−) to obtain an error between the two values, and outputs the error thus obtained to the current controller (36). Thereafter, the current controller (36) that has received the torque current outputted from the comparator (35) and the flux current outputted from the comparator (42) outputs the flux voltage command value ($v_{ds}^{e*}$) and the torque voltage command value ($v_{qs}^{e*}$) to the voltage coordinate converter (47) through the control. The voltage coordinate converter (37) receives the flux voltage command value ($v_{ds}^{s*}$) and the torque voltage command value ($v_{qs}^{s*}$) and converts the received flux voltage command value ($v_{ds}^{s*}$) and the torque voltage command value ($v_{qs}^{s*}$) to 3-phase voltages ($v_{as}$, $v_{bs}$, $v_{cs}$) through the 3-phase voltage converter (38) and provides to the vector control inverter (39). Now, the vector control inverter (39) applies the 3-phase voltages ($v_{as}$, $v_{bs}$, $v_{cs}$) to the induction motor (50), whereby the induction motor (50) is rotated to generate the actual flux current ($i_{ds}^e$) and the torque current ($i_{qs}^e$) converted to d axis and q axis from the actual rotation coordinate through the current coordinate converter (47) and the 2-phase current converter (48), where the flux current ($i_{ds}^e$) among the current thus generated is outputted to the comparator (42), and the torque current ($i_{qs}^e$) is outputted to the comparator (35).

Furthermore, the slip computing element (44) computes a slip frequency ($\omega_{sl}$) using the torque current command value ($i_{qs}^{e*}$) outputted from the velocity controller (34), the flux current command value ($i_{ds}^{e*}$) inputted from outside and the induction motor rotor time constant (Tr), and outputs to a terminal at one side of the adder (45). Then, the adder (45) adds the velocity ($\omega_r$) outputted from the velocity detector (49) to the slip frequency ($\omega_{sl}$) outputted from the slip computing element (44) and outputs the addition to the integrator (46), where the integrator (46) outputs a value integrated to the value outputted from the adder (45), i.e., the position ($\theta$) of the rotor flux to the voltage coordinate converter (37) and the current coordinate converter (47). Thus, the voltage coordinate converter (37) and the current coordinate converter (47) controls the coordinate conversion in response to the position ($\theta$) of the rotor flux inputted from the integrator (46). The subsequent operations are as per the foregoing mentioned erstwhile.

The first advantageous effect from the vector control apparatus of induction motor according to an exemplary embodiment of the present disclosure is that compensation gain is computed by using an output value of PID controller by the compensation gain computing element.

The second advantageous effect is to realize a diameter computation-free winder velocity control algorithm for constantly maintaining a tension using no diameter computation by compensating, without diameter computation, a linear velocity for maintaining a tension, aside from a PID controller by applying a computed compensation gain to a command linear velocity.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. A vector control apparatus configured to control tension of a motor free from diameter computation, the vector control apparatus comprising:
    a tension velocity generator configured to generate command velocity information for constantly maintaining a tension of the motor by adding a PID (Proportional Integral Differential) output value to a value computing a compensation gain value substituting a diameter computation value of a motor to be controlled and a command linear velocity provided from outside; and
    a vector controller configured to perform a tension control of the motor by receiving the command velocity information provided the tension velocity generator.

2. The vector control apparatus of claim 1, wherein the tension velocity generator includes a comparator configured to compare a PID command inputted from the outside with a PID feedback value and to output an error of PID value in response to the comparison, a PID controller configured to output a PID output for compensating the error of the PID value outputted from the comparator, a compensation gain computing element configured to compute a compensation gain corresponding to a diameter value of the motor by determining the PID output, a multiplier configured to multiply a command velocity provided from the outside for control of the motor by the compensation gain, and an adder configured to add a command velocity outputted from the multiplier and a PID output outputted from the PID controller.

3. The vector control apparatus of claim 1, wherein a final command velocity computation configured to control the motor by the vector control apparatus is computed based on the a formula of (command velocity [rad/s]={(linear velocity command [rad/s]*compensation gain(CompGain))+PID output [rad/s]}.

* * * * *